(12) United States Patent
Bitter et al.

(10) Patent No.: US 12,299,716 B1
(45) Date of Patent: May 13, 2025

(54) SYSTEMS AND METHODS FOR MANAGING PERSONALIZED ADVERTISEMENTS

(71) Applicant: United Services Automobile Association (USAA), San Antonio, TX (US)

(72) Inventors: Dustin Bowen Bitter, Lehi, UT (US); Jennifer Marie Chandler-Bradley, Tampa, FL (US); William Daniel Farmer, Carrollton, TX (US); Gabrielle Diane Salazar, San Antonio, TX (US); Oscar Guerra, San Antonio, TX (US); Jeanie Graciela Lopez, San Antonio, TX (US); Mitzi Ruiz, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 18/215,037

(22) Filed: Jun. 27, 2023

Related U.S. Application Data

(60) Provisional application No. 63/357,257, filed on Jun. 30, 2022.

(51) Int. Cl.
*G06Q 30/0251* (2023.01)
*G06Q 30/0241* (2023.01)

(52) U.S. Cl.
CPC ..... *G06Q 30/0271* (2013.01); *G06Q 30/0255* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 11,615,163 B2* | 3/2023 | Kwatra | ............... | G06F 16/9538 715/234 |
| 2012/0095835 A1* | 4/2012 | Makar | .................... | G06N 20/00 705/14.66 |
| 2012/0150633 A1* | 6/2012 | Chung | ............... | G06Q 30/0251 705/14.49 |
| 2013/0007596 A1* | 1/2013 | Vandermolen | .......... | G06F 16/93 715/234 |
| 2015/0127565 A1* | 5/2015 | Chevalier | .............. | G06Q 10/00 705/319 |

(Continued)

*Primary Examiner* — Allan J Woodworth, II
(74) *Attorney, Agent, or Firm* — Fletcher Yoder, PC

(57) ABSTRACT

A computing system includes memory and a processor system configured to determine client data related to a client, where the client data includes client web activity data of the client, determine that the client has logged into a website hosted by the computing system via a client device, provide, to the client device, a personalized advertisement for presentation to the client within a limited predetermined time window of the client having logged into the website, or in response to receiving a secondary confirmation of an identity of the client, receive, from the client device, client interactions of the client with the personalized advertisement, and in response to determining that the client interactions include an acceptance of an offer indicated by the personalized advertisement, communicatively connect the client to a service representative to complete the acceptance of the offer, where the service representative is blocked from accessing the client web activity data.

20 Claims, 3 Drawing Sheets

(56) References Cited

U.S. PATENT DOCUMENTS

| | | | |
|---|---|---|---|
| 2015/0379565 A1* | 12/2015 | Hiramatsu | G06Q 30/0253 |
| | | | 705/14.51 |
| 2018/0357680 A1* | 12/2018 | Singh | G06Q 30/0617 |
| 2019/0095775 A1* | 3/2019 | Lembersky | G06N 3/006 |
| 2020/0311613 A1* | 10/2020 | Ma | G06N 20/20 |
| 2021/0392048 A1* | 12/2021 | Olden | H04L 41/0816 |

* cited by examiner

SYSTEMS AND METHODS FOR MANAGING PERSONALIZED ADVERTISEMENTS

CROSS-REFERENCE TO RELATED APPLICATIONS

This application claims priority to and the benefit of U.S. Provisional Application No. 63/357,257, entitled "Systems and Methods for Managing Personalized Advertisements," filed Jun. 30, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Virtual assistants are often used by businesses to handle certain requests of clients. For example, when a client visits a website of a business, a user interface may be provided to enable the client to provide natural language requests to request certain actions be performed, such as opening an account, checking an account balance, placing an order for a good or service, or updating account information. In some implementations, the user interface of a virtual assistant may enable natural language requests to be supplied by the client in spoken or written form, and enable responses (e.g., follow-up questions, confirmations of actions performed) generated by the virtual assistant to be provided back to the client in spoken or written form. While certain client requests may result in the virtual assistant handing off a conversation to a service representative to perform actions to satisfy these requests, virtual assistants often provide frontline interactions and serve as a first point of contact with clients, desirably reducing operational costs and increasing the availability of service representatives to perform more intricate tasks that are beyond the capabilities of the virtual assistant.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a computing system includes memory storing instructions and a processor system configured to execute the instructions to perform actions including determining, from one or more data sources, client data related to a client, where the client data includes client web activity data of the client, determining that the client has logged into a website hosted by the computing system via a client device, and providing to the client device, a personalized advertisement for presentation to the client within a limited predetermined time window of the client having logged into the website, or in response to receiving a secondary confirmation of an identity of the client, or any combination thereof. The processor system is further configured to execute the instructions to perform actions including receiving, from the client device, client interactions of the client with the personalized advertisement, and in response to determining that the client interactions include an acceptance of an offer indicated by the personalized advertisement, communicatively connecting the client to a service representative to complete the acceptance of the offer, where the service representative is blocked from accessing the client web activity data of the client.

In another embodiment, a method of operating a computing system includes determining, from one or more data sources, client data related to a client, where the client data includes client web activity data of the client, determining that the client has logged into a website hosted by the computing system via a client device, and providing, to the client device, a personalized advertisement for presentation to the client within a limited predetermined time window of the client having logged into the website, or in response to receiving a secondary confirmation of an identity of the client, or any combination thereof. The method further includes receiving, from the client device, client interactions of the client with the personalized advertisement, and in response to determining that the client interactions include an acceptance of an offer indicated by the personalized advertisement, communicatively connecting the client to a service representative to complete the acceptance of the offer, wherein the service representative is blocked from accessing the client web activity data of the client.

In another embodiment, a non-transitory, computer-readable medium, includes instructions stored thereon that, when executed by processing circuitry, cause the processing circuitry to determine, from one or more data sources, client data related to a client, where the client data includes client web activity data of the client, determine that the client has logged into a website hosted by a computing system via a client device, and provide, to the client device, a personalized advertisement for presentation to the client within a limited predetermined time window of the client having logged into the website, or in response to receiving a secondary confirmation of an identity of the client, or any combination thereof. The instructions are further configured to cause the processing circuitry to receive, from the client device, client interactions of the client with the personalized advertisement, and in response to determining that the client interactions include an acceptance of an offer indicated by the personalized advertisement, communicatively connect the client to a service representative to complete the acceptance of the offer, wherein the service representative is blocked from accessing the client web activity data of the client.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
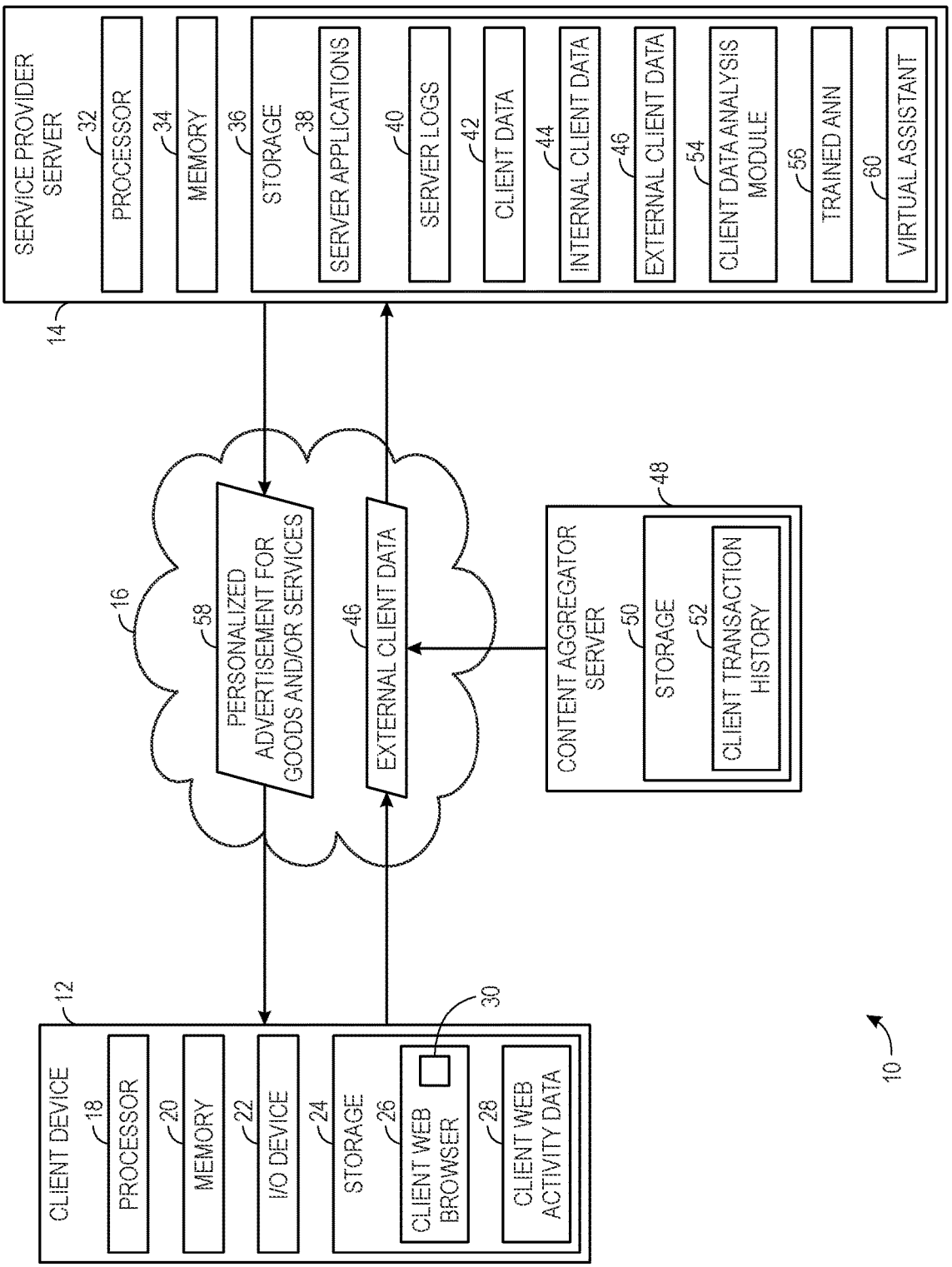
FIG. 1 is schematic diagram of an embodiment of a client-server architecture for managing personalized advertisements provided by a service provider server to a client device, in accordance with the present technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to managing personalized advertisements that are provided to clients by a service provider. As noted above, virtual assistants (e.g., chat bots) may be used by a service provider to provide frontline interactions with clients. In some cases, the virtual assistant may be a first point of contact to introduce a client to new goods and/or services offered by the service provider. As such, it is presently recognized that it may be desirable for the virtual assistant to use client data to determine how best to advertise goods and/or services to a particular client. For example, the client data may include data relating to the websites the client has visited, the web searches that the client has performed, account information of the client, transaction history of the client, and so forth. Based on this client data, a server of the service provider may determine suitable personalized advertisements to provide to the client (e.g., via the virtual assistant) regarding goods and/or services offered by the service provider. Furthermore, the server of the service provider may track and store information regarding client interactions with a personalized advertisement provided to the client, and may manage future personalized advertisements based, at least in part, on these client interactions.

Specifically, present embodiments may provide recommendations for particular banking and insurance products based on established information (e.g., amount of savings, loan data) associated with clients (e.g., users) and monitored interactions performed by the user (e.g., website navigation). For example, offers for particular financial products may be provided to a client based upon interests discerned from the websites the client has visited. Recommendations may be based directly on interactions. For example, a user visiting a website that lists new homes for sale may trigger provision of a home loan offer. In other instances, indirect correlations to desirable offers may be made. For example, based on historical activity data for individuals with overlapping characteristics with the client, an artificial intelligence (AI) component may identify advertisements that are likely of interest to the client based on indirectly related activity (e.g., reviewing a series of websites may suggest that the client is potentially interested in a new savings account based on historical data for similar clients). It should be noted that the subject matter associated with some client activity (e.g., the subject matter of a website) may not be readily discernable. For example, a particular website may not identify itself or the subject matter it covers. However, presently disclosed embodiments may activate a screen capture of the website after a threshold observation time (e.g., an amount of time the client has been reviewing the website). Such screen captures may be submitted for evaluation by the AI component to discern the nature of the subject matter and use it for the previously discussed analysis purposes. These topics, once identified by the AI component, can then be directed for further evaluation by one or more AI components to identify directed advertisements for the client.

With the foregoing in mind, FIG. 1 is schematic diagram of an embodiment of a client-server architecture 10 for managing personalized advertisements provided to a client device 12 via a service provider server 14. The client-server architecture 10 includes at least one client device 12 that is communicatively coupled to at least one service provider server 14 (also referred to herein as simply "server") via a suitable network 16. In certain embodiments, the client device 12 may be a desktop computer, a laptop computer, a smart phone, or another suitable computing device. In certain embodiments, the server 14 may be a server disposed within a data center or disposed at a location of the service provider. The network 16 includes a wide-area network (WAN), a local-area network (LAN), a virtual private network (VPN), the internet, another suitable wired and/or wireless network, or any suitable combination thereof.

For the illustrated embodiment, the client device 12 includes at least one processor 18 (e.g., a central processing unit (CPU), a graphic processing unit (GPU)), at least one memory 20 (e.g., random access memory (RAM), read-only memory (ROM)), at least one input/output (I/O) device 22 (e.g., a mouse, keyboard, touchscreen, microphone, camera, fingerprint sensor, other human interface device (HID)), and at least one storage 24 (e.g., a hard disk drive (HDD), a solid-state disk (SSD), flash memory). In certain embodiments, the client device 12 may be a smart phone device, and the at least one I/O device 22 may include a front-facing camera that is capable of detecting the face of the client using the device and/or a fingerprint reader capable of detecting the fingerprint of the client using the device. The storage 24 of the client device 12 may store any suitable number of applications or apps that are executed by the processor 18 to provide desired functionality at the client device 12.

For the illustrated embodiment, the storage 24 of the client device 12 stores a client web browser 26 that can be loaded into memory 20 and executed by the processor 18 to enable the client device 12 to interact with websites, including websites hosted by the server 14. Additionally, for the illustrated embodiment, the storage 24 of the client device 12 also stores client web activity data 28. For example, the client web activity data 28 may include details relating to which websites the client has visited, how long each portion of each website was visited, items (e.g., links, images, videos) selected on each website, web searches performed by the client, topics of websites and web pages visited by the client, and so forth. In some embodiments, the client web activity data 28 may be stored in one or more logs (e.g., web browsing history) generated by the client web browser 26 based on the web-related activities of the client using the client device 12.

In some embodiments, the client web browser 26 may additionally or alternatively include a plug-in 30 that is designed to collect at least a portion of the client web activity data 28 based on the web-related activities of the client. For embodiments that include the plug-in 30, the plug-in 30 may include instructions and/or machine-learning components that enable the plug-in 30 to determine one or more topics related to a website, a web page, a portion of a web page, media content of a web page, and so forth. For example, in some embodiments, the plug-in 30 may include an optical character recognition (OCR) component that extracts textual topic information from certain media content (e.g., a hosted document, image, or video) of a website visited by the client using the client web browser 26. As another example, the plug-in 30 may include an image recognition component that determines topic information for certain media content (e.g., a hosted image or video) of a website visited by the client using the client web browser 26. In some embodiments, the plug-in 30 may include a repository that stores the identity of certain websites and topics known to be associated with each these websites, such that the plug-in 30 can use this repository to determine and store a topic information in the client web activity data 28 based on websites visited by the client using the client web browser 26.

For example, in some embodiments, the plug-in 30 may collect client web activity data 28 indicating that the client has visited a website that lists new homes for sale, which may result in the server 14 providing a personalized advertisement 58 for a home loan offer. In other instances, indirect correlations to desirable offers may be made. In some embodiments, the plug-in 30 may include an AI component that operates at the client device 12 and may operate in conjunction with one or more AI components of the server 14 to determine topics of interest to the client and to generate relevant personalized advertisements based on these topics. It should be noted that the subject matter associated with some client activity (e.g., the subject matter of a website) may not be readily discernable. For example, a particular website may not identify itself or the subject matter it covers. However, in certain embodiments, the plug-in 30 may activate a data capture (e.g., screen capture, text capture, image capture, data dump) of the website after a threshold observation time (e.g., an amount of time the client has been reviewing the website). Such data captures may be submitted for evaluation by an AI component of the plug-in 30 or an AI component of the server 14 to discern the nature of the subject matter and determine topics of interest to the client. For example, these identified topics can then be directed for further evaluation by one or more AI components of the server 14 to identify directed advertisements for the client. For example, based on historical activity data for individuals with overlapping characteristics with the client, one or more AI components may identify advertisements that are likely of interest to the client based on indirectly related activity (e.g., reviewing a series of websites may suggest that the client is potentially interested in a new savings account based on historical data for similar clients).

For the embodiment illustrated in FIG. 1, the server 14 includes at least one processor or processor system 32 (e.g., a CPU, a GPU, processing circuitry), memory 34 (e.g., at least one RAM, ROM), and storage 36 (e.g., one or more HDD, SSD, flash memory). The storage 36 of the server 14 may store a number of server applications 38, including but not limited to, web serving applications, user interface applications, cloud-based applications, e-commerce applications, account management applications, and so forth, which are executed by the processor system 32 to provide desired functionality to the client via the client device 12. The storage 36 of the server 14 also includes server logs 40, which store information relating to the activities of the server applications 38 during operation. For example, the server logs 40 may include logs from a web serving application, and may indicate when a hosted web page or media content was accessed, an identity of the client device 12 or client that requested the web page, an amount of time between each web request, and so forth. It should be noted that the processor system 32 may represent a single processor, multiple processors operating together, multiple processors operating separately, or any arrangement or combinations of processor(s) functioning in cooperation and/or individual operation to complete one or more processing tasks.

For the embodiment illustrated in FIG. 1, the storage 36 of the server 14 also stores client data 42 that is related to the client operating the client device 12. The client data 42 may include external client data 46 received by the server 14 from one or more communicatively coupled external systems, such as the client device 12 or another server. For example, the external client data 46 may include client web activity data 28 that is provided to the server 14 by the client device 12 via the network 16 and stored as part of the client data 42. As such, it may be appreciated that, in some cases, at least a portion of the client web activity data 28 may additionally or alternatively be gleaned from analysis of the server logs 40. In some embodiments, the server 14 may be communicatively coupled to a content aggregator server 48 (e.g., MINT®) having a storage 50 that includes client transaction history data 52 for the client, and the server 14 may receive the client transaction history data 52 as external client data 46 from the content aggregator server 48 via the network 16 to be stored as part of the client data 42.

For the embodiment illustrated in FIG. 1, the client data 42 also includes internal client data 44, which is client-related data that is specific to a service provider. This internal client data may include, for example, client account data, such as data related to accounts, balances, limits, transaction volume, how long the customer has had a relationship with the service provider, particular goods and/or services purchased from the service provider by the client, and so forth. The internal client data 44 may also include information regarding client interactions with previous advertisements, such as data relating to the details of previous personalized advertisements, an amount of time the client viewed the personalized advertisement, mouse or cursor movements with respect to the personalized advertisement, mouse or cursor selections with respect to the personalized advertisement, whether or not an offer indicated in the personalized advertisement was accepted by the client, how long the client subscribed to an advertised service, data related to the presentation (e.g., font, images, style, tone) of previously interacted advertisements, and so forth.

For the embodiment illustrated in FIG. 1, the storage 36 of the server 14 includes a client data analysis module 54 that stores instructions executable by the processor system 32 (e.g., a single processor or multiple processors) to enable the server 14 to manage (e.g., generate, select, remove) personalized advertisements to offer goods and/or services to the client based on the stored client data 42. In certain embodiments, the storage 36 may additionally or alternatively include a trained artificial neural network (ANN) 56 that, as discussed below, has been trained to generate personalized advertisements to offer goods and/or services to the client based on the stored client data 42. As discussed below, the server 14 is generally configured to use the client data analysis module 54 and/or the trained ANN 56 to determine at least one personalized advertisement 58 for goods and/or services offered by the service provider to the client device 12 for presentation to the client.

For the embodiment illustrated in FIG. 1, the storage 36 of the server 14 also includes a virtual assistant 60 that is executed by the processor 32 to enable the server 14 to receive natural language requests from, and to provide natural language responses to, the client device 12. For example, the client may access a website hosted by the server 14 using the client web browser 26 of the client device 12, and the website may include a user interface (e.g., a chat window) that enables the virtual assistant 60 to receive requests from, and to provide responses to, the client. In some cases, the server 14 may execute one or more of the server applications 38 to address certain natural language requests of the client, such as to open or to check the balance of an account. Additionally, in certain embodiments, the virtual assistant 60 may be configured to deliver the personalized advertisement 58 to the client device 12 for presentation to the client in response to particular activities of the client, such as upon visiting a website hosted by the server 14, upon logging into a website hosted by the server 14, upon providing secondary confirmation of an identity of the client (e.g., via a fingerprint reader or camera of the client device 12, upon logging out of a website hosted by the server 14, and so forth.

For the embodiment illustrated in FIG. 1, the memory 34 and the storage 36 may be any suitable articles of manufacture that can serve as media to store processor-executable code, data, or the like. These articles of manufacture may represent computer-readable media (e.g., any suitable form of memory or storage) that may store the processor-executable code used by the processor system 32 to perform the presently disclosed techniques. The memory 34 and the storage 36 may also be used to store above-described data, various other software applications and modules for analyzing the data, and the like. The memory 34 and the storage 36 may represent non-transitory computer-readable media (e.g., any suitable form of memory or storage) that may store the processor-executable code used by the processor 32 to perform various techniques described herein. It should be noted that non-transitory merely indicates that the media is tangible and not a signal.

Figure 2:
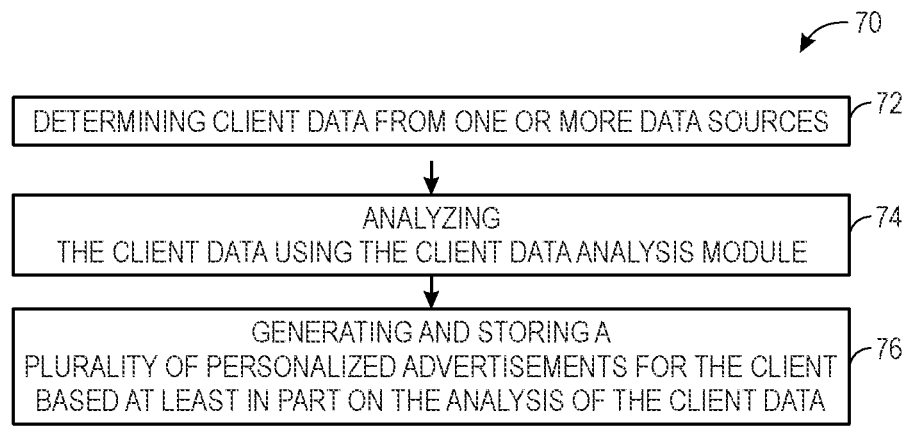
FIG. 2 is a flow diagram of an embodiment of a process whereby the service provider server generates personalized advertisements based on client data, in accordance with the present technique.

FIG. 2 is a flow diagram illustrating an embodiment of a process 70 whereby the service provider server 14 generates personalized advertisements based on client data 42. The process 70 may be implemented using computer-readable instructions stored in the at least one memory 34 and executed by the at least one processor 32 of the server 14. The process 70 is discussed with reference to elements illustrated in FIG. 1. For the illustrated embodiment, the process 70 begins with the server 14 determining (block 72) client data 42 from one or more data sources. As noted above, the server 14 may receive external client data 46 from the client device 12 and/or the content aggregator server 48, which may be stored as part of the client data 42. Additionally, the server 14 may also access stored internal client data 44 related to historical interactions between the client and the service provider, which may comprise a portion of the client data 42.

For the embodiment illustrated in FIG. 2, the process 70 continues with the server 14 analyzing (block 74) the client data 42 using the client data analysis module 54. Subsequently, the process 70 proceeds with the server 14 generating and storing (block 76) a plurality of personalized advertisements for the client based at least in part on the analysis of the client data 42. In some embodiments, the client data analysis module 54 may define a set of conditions for each potential advertisement that, when satisfied by the client data 42, result in a particular advertisement being generated or selected for the client. For example, the client data analysis module 54 may compare aspects of the client web activity data 28 (e.g., websites visited, topics of websites visited, website analytics) and/or the client transaction history information (e.g., payment histories, subscription histories, credit histories) to these conditions to generate or select advertisements that correspond with topics of interest to the client, based on this external client data 46. In certain embodiments, the client data analysis module 54 may determine a topic of interest based on the client web activity data 28. For example, in certain embodiments, a website or application may provide an indication of a topic associated with the website or application. However, in other embodiments, the website or application accessed by the user may not include an indication of a topic, and screen capture analytics may be triggered to determine a topic. For example, screen capture analytics may be triggered (e.g., via the plug-in 30) based upon a user spending a threshold amount of time on a particular webpage or website. Machine learning may then be employed to identify a topic of the webpage or website (e.g., via optical character recognition and/or image recognition). The identified topic may then be provided to a second machine learning model to identify products offerings and advertisements associated with the identified topic. The client data analysis module 54 may additionally or alternatively compare aspects of internal client data 44 (e.g., accounts opened, account balances, client interactions with previous advertisements) to these conditions to generate or select advertisements that correspond with prospective needs of the client, based on this internal client data 44. In some embodiments, the plurality of personalized advertisements may be ranked and sorted, for example, based on the number of the degree of the conditions satisfied by the client data 42. In some embodiments, the generated personal advertisements may be suitably stored within the storage 36 of the server 14 for later retrieval.

Figure 3:
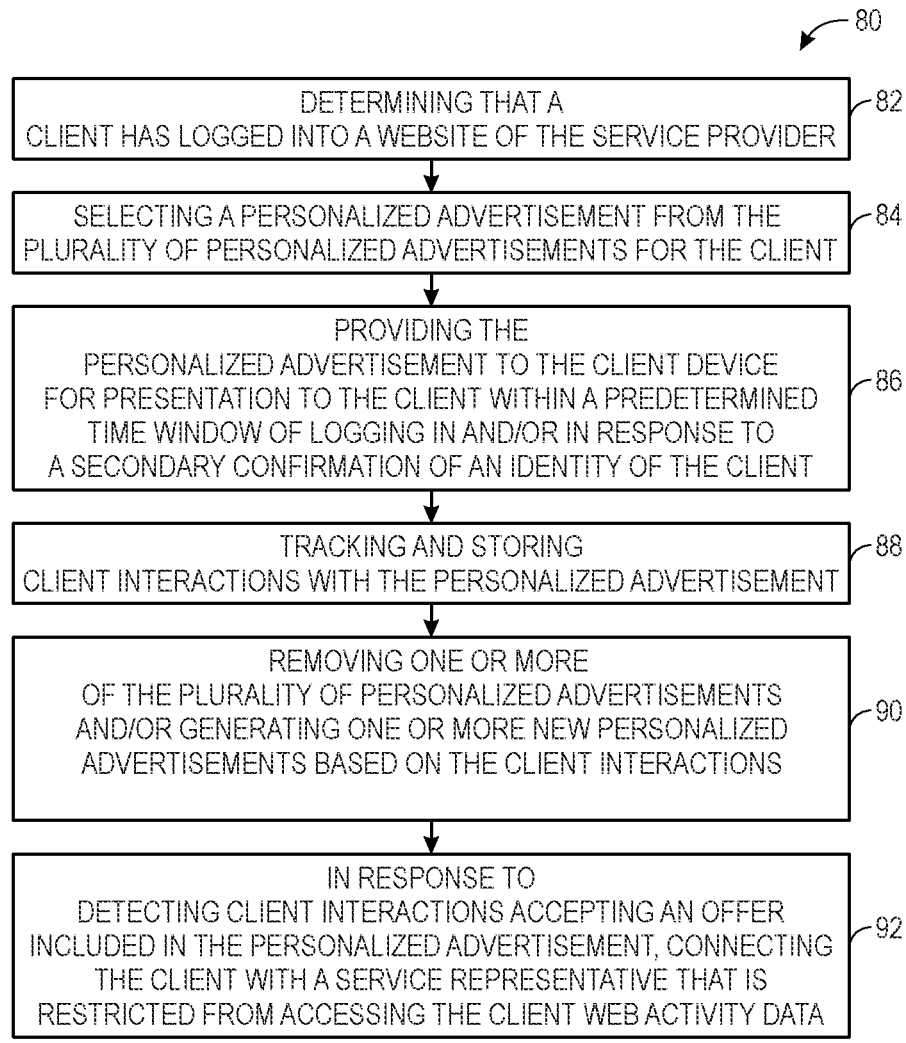
FIG. 3 is a flow diagram of an embodiment of a process whereby the service provider server manages personalized advertisements of a client, in accordance with the present technique.

FIG. 3 is a flow diagram illustrating an embodiment of a process 80 whereby the server 14 provides and manages personalized advertisements for a client. The process 80 may be implemented using computer-readable instructions stored in the at least one memory 34 and executed by the at least one processor 32 of the server 14. The process 80 is discussed with reference to elements illustrated in FIG. 1. For the illustrated embodiment, the process 80 begins with the server 14 determining (block 82) that a client has logged into a website (e.g., an e-commerce website, an account management website) hosted by the server 14 of the service provider. For example, the server 14 may determine that the client has provided suitable credentials (e.g., a username, a password, an access code, a cryptographic key, or combinations thereof) to login to the website of the server 14. The process 80 continues with the server 14 selecting (block 84) a personalized advertisement from the plurality of personalized advertisements previously generated for the client, as discussed above with respect to FIG. 2. For example, in some embodiments, the server 14 may select the personalized advertisement based on the client data 42 (e.g., banking account data, insurance data, investment data). For embodiments in which the plurality of personalized advertisements are ranked and sorted, the server 14 may select the highest ranked personalized advertisement.

For the embodiment illustrated in FIG. 3, the process 80 continues with the server 14 providing (block 86) the personalized advertisement 58 to the client device 12 for presentation to the client. In certain embodiments, the server 14 may particularly deliver the personalized advertisement 58 to the client device 12 via the virtual assistant 60. For example, the virtual assistant 60 of the server 14 may provide, to the client device 12, a suitable communication interface (e.g., a chat window) that is presented via an I/O device 22 (e.g., a display) of the client device 12. In certain embodiments, the server 14 may only provide the personalized advertisement 58 to the client in response to confirming the identity of the client, such that any personalized details of the offer (e.g., an account, an account limit, an account interest rate) are only presented by the client device 12 to the client, and not to another potential user of the client device 12. As such, in some embodiments, the server 14 may only provide the personalized advertisement 58 to the client device 12 for presentation to the client within a predetermined time window (e.g., 1 minute, 5 minutes, 10 minutes, limited predetermined time window) of logging into the website. In some embodiments, the server 14 may only provide the personalized advertisement 58 to the client device 12 for presentation to the client in response to receiving secondary confirmation of the identity of the client, such as receiving biometric information (e.g., a fingerprint, an image of the face of the client) or receiving indications of verified biometric information by the client device 12 (e.g., face ID or face authentication) confirming the identity of the user of the client device 12 as the client. In some embodiments, the server 14 may deliver the personalized advertisement 58 to the client via an interface (e.g., a particular application or user interface) identified as preferred by the client based on historical activity and/or client input.

For the embodiment illustrated in FIG. 3, the process 80 continues with the server 14 tracking and storing (block 88) client interactions with the personalized advertisement 58. For example, the server 14 may update the stored internal client data 44 to include details regarding how the client viewed and/or accessed the personalized advertisement 58, such as how long the personalized advertisement 58 was presented on a display of the client device 12, how long the client hovered over the personalized advertisement 58, whether the client clicked or selected the personalized advertisement 58, how long the client considered the personalized advertisement 58 before responding, whether the client proceeded to accept, decline, or ignore the personalized advertisement 58, and so forth. In some embodiments, the server 14 may store, as part of the internal client data 44, details regarding the personalized advertisement 58, such as the good or service being offered, stylistic aspects (e.g., fonts, size, colors, images), language/diction, time windows for response, and so forth.

For the embodiment illustrated in FIG. 3, the process 80 continues with the server 14 removing one or more of the plurality of personalized advertisements and/or generating one or more new personalized advertisements based on the client interactions, as indicated in block 90. For example, the client data analysis module 54 of the server 14 may analyze the client interactions with the personalized advertisement 58 to determine which of the stored plurality of personalized advertisements for the client should be removed, as well as which new personalized advertisements should be generated and stored as part of the plurality of personalized advertisements for the client. For example, the client data analysis module 54 may define a set of conditions for each of the plurality of advertisements that, when satisfied (or left unsatisfied) by the client interactions, result in a particular advertisement being removed from the plurality of personalized advertisements. By way of example, in response to determining that the client interactions correspond to the client declining an offer associated with the personalized advertisement 58, the server 14 may remove other personalized advertisements related to the same product, other personalized advertisements having the same style, other personalized advertisements related to the same topic, and so forth. In another example, in response to determining that the client interactions correspond to the client accepting an offer associated with the personalized advertisement 58, the server 14 may generate new personalized advertisements related to similar or related products, other personalized advertisements having the same style, other personalized advertisements related to the same topic or related topics, and so forth.

For the embodiment illustrated in FIG. 3, the process 80 continues with the server 14, in response to detecting (e.g., receiving and determining) client interactions accepting an offer represented in the personalized advertisement 58, connecting (block 92) the client with a service representative that does not have access to the client web activity data 28. For example, for embodiments in which the virtual assistant 60 provides the personalized advertisement 58 to the client, the virtual assistant 60 may receive client interactions accepting the offer represented in the personalized advertisement 58, and in response, may hand off the dialog with the client to a human service representative to complete the acceptance of the offer with the client. While the service representative may have access to certain client data 42, such as the internal client data 44 related to client activities related to the service provider (e.g., account data, purchase history, client interactions with personalized advertisements), the server 14 blocks (e.g., prevents, restricts, denies) the service representative from having access to the client web activity data 28. As such, the service representative has access to sufficient client data to complete acceptance of the offer, while the client web activity data 28 remains isolated from the service representative to enhance client privacy.

Figure 4:
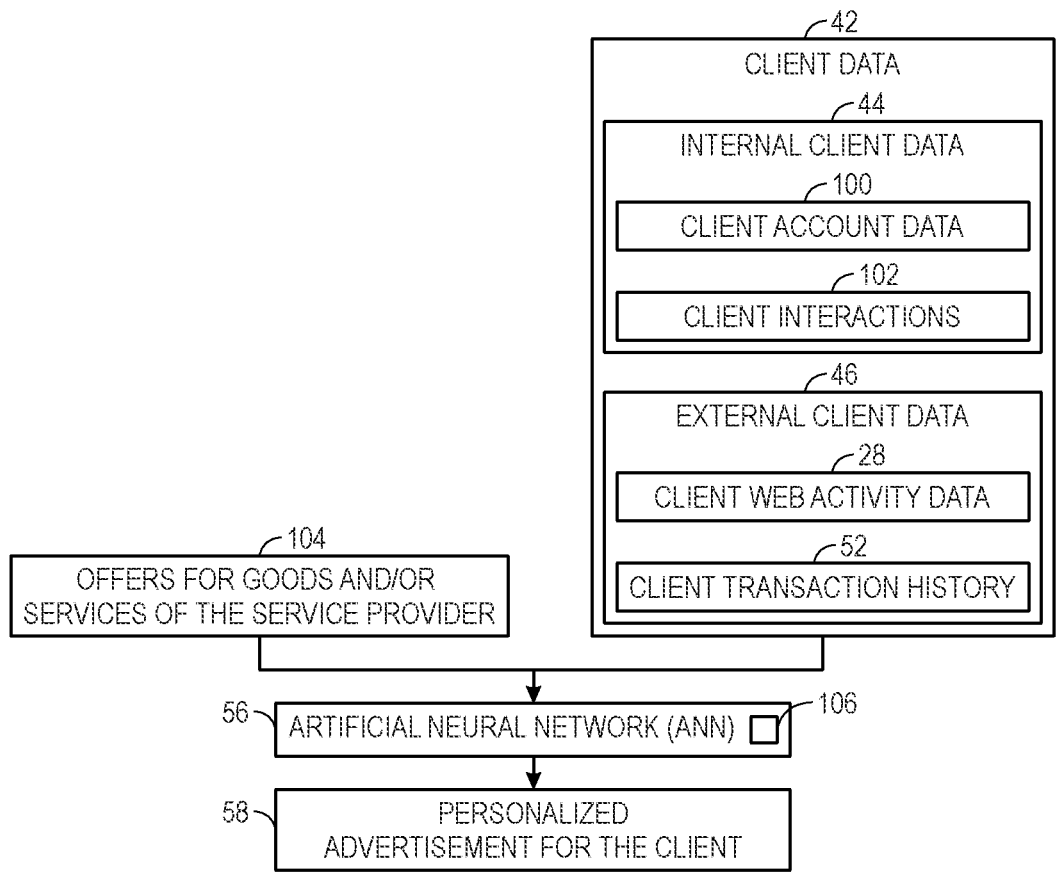
FIG. 4 is a schematic diagram of an embodiment of an artificial neural network (ANN) trained to determine personalized advertisements for a client based at least in part on client data, in accordance with the present technique.

FIG. 4 is a schematic diagram of an embodiment of the trained artificial neural network (ANN) 56, which is trained to determine the personalized advertisement 58 for a client based at least in part on client data 42. As noted above, the client data 42 may include any data related to the client that can be used to determine the personalized advertisement 58 for the client. For example, as discussed above, in some embodiments, the internal client data 44 may include client account data 100, and may include stored client interactions 102 with previously provided personalized advertisements. Additionally, as discussed above, in some embodiments, the external client data 46 may include client web activity data 28 and/or client transaction history data 52.

For the embodiment illustrated in FIG. 4, the trained ANN 56 is configured to receive, as inputs, at least a portion of the client data 42. In some embodiments, the trained ANN 56 may also be configured to receive, as part of the inputs, a current set of potential offers for goods and/or services of the service provider. The trained ANN 56 includes a set of weight values 106 that are initially determined during training of the ANN 56, and that are updated, as discussed below, to adjust how the trained ANN 56 generates the personalized advertisement 58 for the client based on the inputs. For example, during training of the ANN, sets of labeled training data may be provided as the inputs to the ANN, such as training sets of "dummy" client data 42 and corresponding personalized advertisements that the designer desires the ANN to generate in response to each training set of client data. The weight values 106 of the ANN are iteratively adjusted based on the response of the ANN to each of the training sets of client data until the output of the ANN to each training set of client data matches the corresponding desired personalized advertisement, resulting in the trained ANN 56. In some embodiments, the server 14 may store a plurality of trained ANNs, each particularly trained or tuned to the interests of a respective client, wherein the configuration of each trained ANN 56 (e.g., the weight values 106) may be stored within the storage 36 of the server 14.

Figure 5:
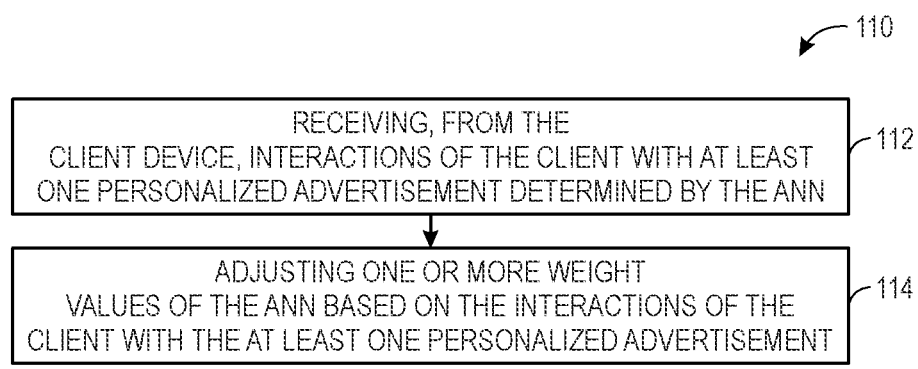
FIG. 5 is a flow diagram of an embodiment of a process whereby the service provider server modifies operation of the ANN in response to client interactions with personalized advertisements, in accordance with the present technique.

FIG. 5 is a flow diagram illustrating an embodiment of a process 110 whereby the operation of the trained ANN 56 is modified in response to client interactions with the at least one personalized advertisement 58 provided to the client by the server 14 of the service provider. The process 110 may be implemented using computer-readable instructions stored in the at least one memory 34 and executed by the at least one processor 32 of the server 14. The process 80 is discussed with reference to elements illustrated in FIGS. 1 and 4. The process 110 begins with the server 14 receiving (block 112), from the client device 12, client interactions 102 of the client with at least one personalized advertisement 58 determined by the trained ANN 56 and served to the client device 12 for presentation to the client. The process 110 continues with the server 14 adjusting (block 114) one or more of the weight values 106 of the trained ANN 56 based on the client interactions 102 with the at least one personalized advertisement. As may be appreciated, adjusting the weight values 106 alters and tunes the behavior of the trained ANN 56. For example, the weight values 106 of the trained ANN 56 may be updated such that the trained ANN 56 generates a different personalized advertisement in response to the client data 42 of the client.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
   memory storing instructions;
   a processor system configured to execute the instructions to perform actions comprising:
      determining, from one or more data sources, client data related to a client, wherein the client data includes client web activity data of the client;
      determining that the client has logged into a website hosted by the computing system via a client device;
      determining that the client has been reviewing the website for a threshold observation time;
      in response to determining that the client has been reviewing the website for the threshold observation time, activating, via a web-browser plug-in, a data capture of the website and incorporating the data capture into the client web activity data;
      providing, to the client device, a personalized advertisement for presentation to the client within a limited predetermined time window of the client having logged into the website and in response to receiving a secondary confirmation of an identity of the client, wherein the personalized advertisement is associated with the client web activity data;
      receiving, from the client device, client interactions of the client with the personalized advertisement; and
      in response to determining that the client interactions include an acceptance of an offer indicated by the personalized advertisement, communicatively connecting the client to a service representative to complete the acceptance of the offer, wherein the service representative is blocked from accessing the client web activity data of the client.

2. The computing system of claim 1, wherein the instructions are configured to be executed by the processor system to operate as a virtual assistant to provide the personalized advertisement to the client device.

3. The computing system of claim 1, comprising the processor system configured to execute the instructions to perform the actions comprising:
   receiving the client web activity data from the client device via the web-browser plug-in.

4. The computing system of claim 1, wherein the web browser plug-in configured to operate on the client device.

5. The computing system of claim 1, wherein the client web activity data indicates which websites the client has visited, topics related to the websites, an amount of time spent on each webpage of the website, or any combination thereof.

6. The computing system of claim 1, wherein the processor system is configured to receive the secondary confirmation of the identity of the client based on inputs received from a fingerprint reader, a camera, or a combination thereof.

7. The computing system of claim 1, wherein the computing system is configured to store server logs associated with hosting the website, and wherein, to determine the client data, the processor system is configured to execute the instructions to perform actions comprising:
 determining at least an additional portion of the client web activity data from the server logs.

8. The computing system of claim 1, comprising the processor system configured to execute the instructions to perform the actions comprising:
 receiving client transaction history data from an external server communicatively coupled to the computing system, wherein the client data comprises the client transaction history data.

9. The computing system of claim 1, wherein the computing system is configured to store client account data, and wherein, to determine the client data, the processor system is configured to execute the stored instructions to perform actions comprising:
 determining the client account data of the client, wherein the client data comprises the client account data.

10. The computing system of claim 1, comprising the processor system configured to execute the instructions to perform the actions comprising:
 determining that the website does not include an indication of a topic;
 analyzing the data capture via an artificial intelligence (AI) component of the web-browser plug-in, wherein the AI component is configured to extract textual topic information from the data capture of the website; and
 determining the topic of the website based on the extracted textual topic information.

11. The computing system of claim 1, comprising the processor system configured to execute the instructions to perform the actions comprising:
 generating a plurality of personalized advertisements for the client based at least in part on the client data;
 storing the plurality of personalized advertisements in the memory;
 selecting the personalized advertisement from the plurality of personalized advertisements based at least in part on the client data; and
 removing one or more of the plurality of personalized advertisements, generating one or more new personalized advertisements for the plurality of personalized advertisements, or any combination thereof, based on the client interactions.

12. The computing system of claim 1, wherein the memory stores a trained artificial neural network (ANN) having a plurality of weight values, and wherein the processor system is configured to execute the instructions to perform the actions comprising:
 providing at least a portion of the client data as inputs to the trained ANN, and receiving, as an output of the trained ANN, the personalized advertisement; and
 adjusting at least a portion of the plurality of weight values based on the client interactions with the personalized advertisement.

13. A method of operating a computing system, comprising:
 determining, from one or more data sources, client data related to a client, wherein the client data includes client web activity data of the client;
 determining that the client has logged into a website hosted by the computing system via a client device;
 determining that the client has been reviewing the website for a threshold observation time;
 in response to determining that the client has been reviewing the website for the threshold observation time, activating, via a web-browser plug-in, a data capture of the website and incorporating the data capture into the client web activity data;
 providing, to the client device, a personalized advertisement for presentation to the client within a limited predetermined time window of the client having logged into the website and in response to receiving a secondary confirmation of an identity of the client, wherein the personalized advertisement is at least partially related to the client web activity data;
 receiving, from the client device, client interactions of the client with the personalized advertisement; and
 in response to determining that the client interactions include an acceptance of an offer indicated by the personalized advertisement, communicatively connecting the client to a service representative to complete the acceptance of the offer, wherein the service representative is blocked from accessing the client web activity data of the client.

14. The method of claim 13, comprising:
 providing, via a virtual assistant of the computing system, the personalized advertisement to the client device for presentation to the client.

15. The method of claim 13, wherein the web-browser plug-in comprises an artificial intelligence (AI) component configured to analyze the data capture to determine a topic related to the website as part of the client web activity data.

16. The method of claim 13, wherein determining the client data comprises:
 receiving client transaction history data of the client from an external server communicatively coupled to the computing system; and
 determining, within at least one storage of the computing system, client account data of the client, wherein the client data comprises the client transaction history data and the client account data.

17. The method of claim 13, comprising:
 generating a plurality of personalized advertisements for the client based at least in part on the client data;
 storing the plurality of personalized advertisements in at least one storage of the computing system;
 selecting the personalized advertisement from the plurality of personalized advertisements based at least in part on the client data; and
 removing one or more of the plurality of personalized advertisements, generating one or more new personalized advertisements for the plurality of personalized advertisements, or any combination thereof, based on the client interactions.

18. The method of claim 13, comprising:
 providing at least a portion of the client data as inputs to a trained artificial neural network (ANN) having a plurality of weight values, and receiving, as an output of the trained ANN, the personalized advertisement; and
 adjusting at least a portion of the plurality of weight values based on the client interactions with the personalized advertisement.

19. A non-transitory, computer-readable medium, having stored thereon instructions that, when executed by processing circuitry, cause the processing circuitry to:
 determine, from one or more data sources, client data related to a client, wherein the client data includes client web activity data of the client;

determine that the client has logged into a website hosted by a computing system via a client device;

determine that the client has been reviewing the website for a threshold observation time;

in response to determining that the client has been reviewing the website for the threshold observation time, activate a data capture of the website and incorporate the data capture into the client web activity data;

provide, to the client device, a personalized advertisement for presentation to the client within a limited predetermined time window of the client having logged into the website and in response to receiving a secondary confirmation of an identity of the client, wherein the personalized advertisement is at least partially related to the client web activity data;

receive, from the client device, client interactions of the client with the personalized advertisement; and in response to determining that the client interactions include an acceptance of an offer indicated by the personalized advertisement, communicatively connect the client to a service representative to complete the acceptance of the offer, wherein the service representative is blocked from accessing the client web activity data of the client.

20. The computing system of claim 1, wherein the data capture comprises an image capture.

* * * * *